April 3, 1945.  E. O. SCHOFIELD  2,372,743
GAFF HOOK
Filed Aug. 2, 1943
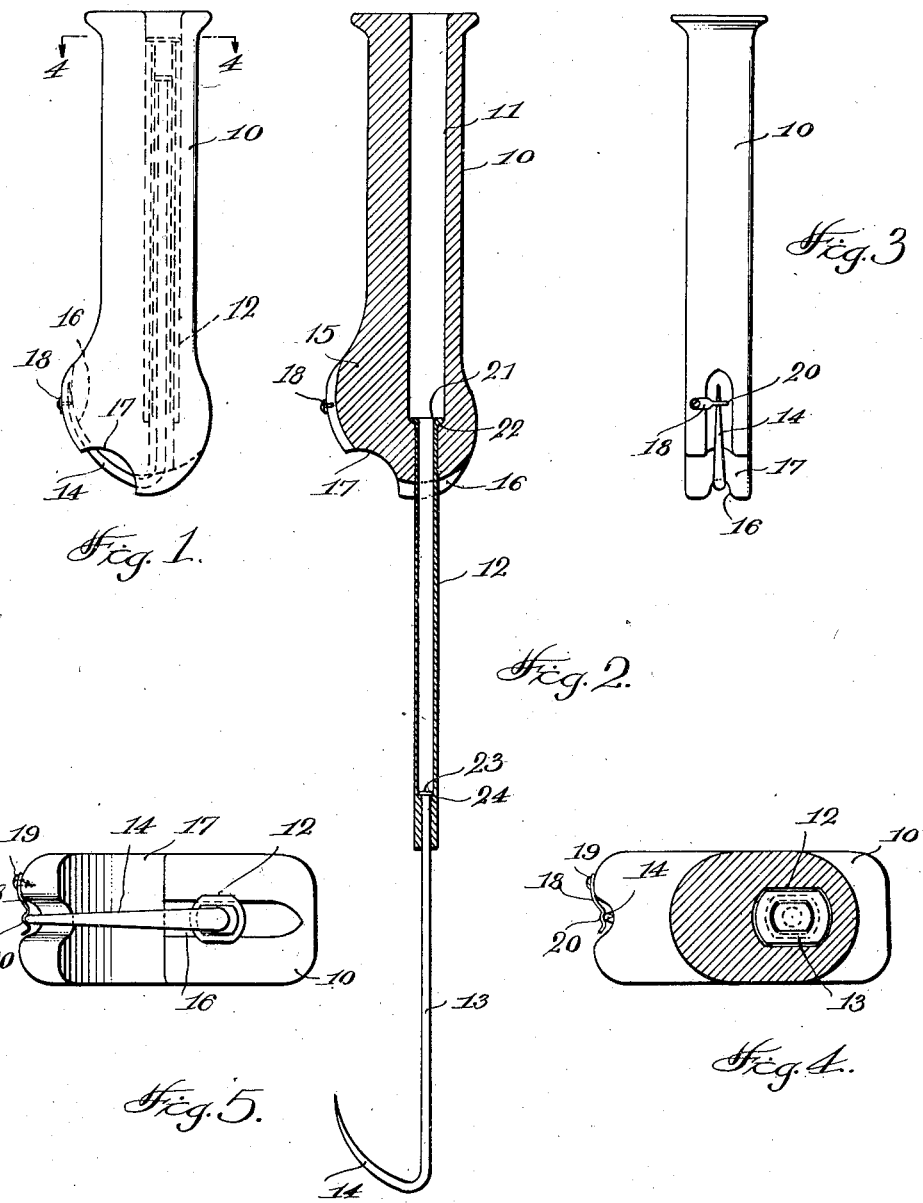
Elbert O. Schofield
INVENTOR
BY Victor J. Evans & Co.
ATTORNEYS
WITNESS Patented Apr. 3, 1945

2,372,743

UNITED STATES PATENT OFFICE 2,372,743

GAFF HOOK

Elbert O. Schofield, Centralia, Wash.

Application August 2, 1943, Serial No. 497,085

3 Claims. (Cl. 43—5)

This invention relates to a gaff hook and has for an object to provide a telescoping gaff hook which when extended to operative position will be rigid and held against swiveling in its handle, and which may be telescoped into its handle to be conveniently carried in the fish basket or pocket of the user so as to be readily accessible when needed.

A further object is to provide a device of this character which will be formed of a few strong, simple and durable parts, which will be inexpensive to manufacture and which will not easily get out of order.

With the above and other objets in view the invention consists of certain novel details of construction, and combinations of parts hereinafter fully described and claimed, it being understood that various modifications may be resorted to within the scope of the appended claims, without departing from the spirit or sacrificing any of the advantages of the invention.

In the accompanying drawing forming part of this specification:

Figure 1 is a side elevation of a gaff hook constructed in accordance with the invention, in telescoped position.

Figure 2 is a longitudinal sectional view of the gaff hook shown in Figure 1, in extended position.

Figure 3 is a front elevation of the gaff hook telescoped and latched in telescoped position.

Figure 4 is a cross sectional view, drawn to large scale, taken on the line 4—4 of Figure 1.

Figure 5 is a bottom plan view, drawn to large scale, showing the gaff hook in telescoped position.

Referring now to the drawing in which like characters of reference designate similar parts in the various views, 10 designates a handle or grip formed with a longitudinal bore 11 therethrough adapted to receive a plurality of rod sections 12 and 13 telescopically assembled, the outmost of which has formed integrally therewith a gaff hook 14 such as is used in landing fish.

The handle 10 is provided with a wide outer end 15, which is rounded and provided with a groove 16 in its rounded end face. The groove is adapted to receive the gaff hook 14 when the rods 12 and 13 are telescoped into each other and into the bore of the handle. A transversely disposed groove 17 intersects the groove 16 to expose the gaff hook 14, see Figure 1, so that it may be grasped by inserting the fingers in the groove 17 to extend the rods 12 and 13 out of the handle to the operative position shown in Figure 2.

A spring latch 18, see Figure 4, is pivotally secured at one end to the widened end 15 of the handle by a screw 19 to be turned to extend across the groove 16 at that portion thereof in which the point of the gaff hook will lie when the gaff hook is in telescoped position and when the gaff hook is to be used, the spring latch is turned to lie parallel with the groove 16 and out of the way of gaff hook 14 so that the gaff hook may be withdrawn from the groove 16. The spring latch is provided with a hump 20 which straddles the pointed end of the gaff hook and yieldably holds the gaff hook in telescoped position.

As best shown in Figure 4 the sections 12 and 13 of the gaff hook are formed with straight opposite sides and curved opposite ends to prevent swiveling movement of the rods relatively to each other and swiveling movement of the telescoped rods in the bore 11 of the handle 10 which bore is of similar cross section to the rod 12.

The rod 12 is provided with a head 21 which engages a shoulder 22 formed at the outer end of the bore to limit extending movement of the rod 12 out of the bore. Likewise the rod 13 is provided with a head 23 which engages a shoulder 24 formed in the tubular rod 12 to limit extending movement of the rod 13 relatively to the rod 12.

From the above description it is thought the invention will be fully understood without further explanation.

What is claimed is:

1. A gaff hook comprising a handle having a longitudinal bore, a plurality of telescopically assembled rods adapted to be telescoped into said bore in non-rotative relationship to the handle and to each other and adapted to be extended relatively to each other and to the handle, a gaff hook formed integral with the end of the outermost rod, said handle being widened at the outer end and terminating in a rounded outer face, there being a groove formed in said rounded outer face adapted to receive the gaff hook when the rods are telescoped into the bore of the handle, means exposing the gaff hook at said groove to be readily extended when the rods are telescoped into the handle, and means yieldably securing the gaff hook in the groove when the rods are telescoped into the handle.

2. The structure as of claim 1 and in which the first-named means comprises a transversely disposed groove in said rounded face exposing the gaff hook and adapted to permit the operator's fingers to grasp the exposed portion of the gaff hook.

3. The structure as of claim 1 and in which the second-named means comprises a spring latch secured to the widened portion of the handle extending across the gaff hook receiving groove and having a hump adapted to straddle the gaff hook when the gaff hook is in telescoped position.

ELBERT O. SCHOFIELD.